MULTIPLE CHANNEL GAIN CONTROL
Filed Dec. 20, 1961
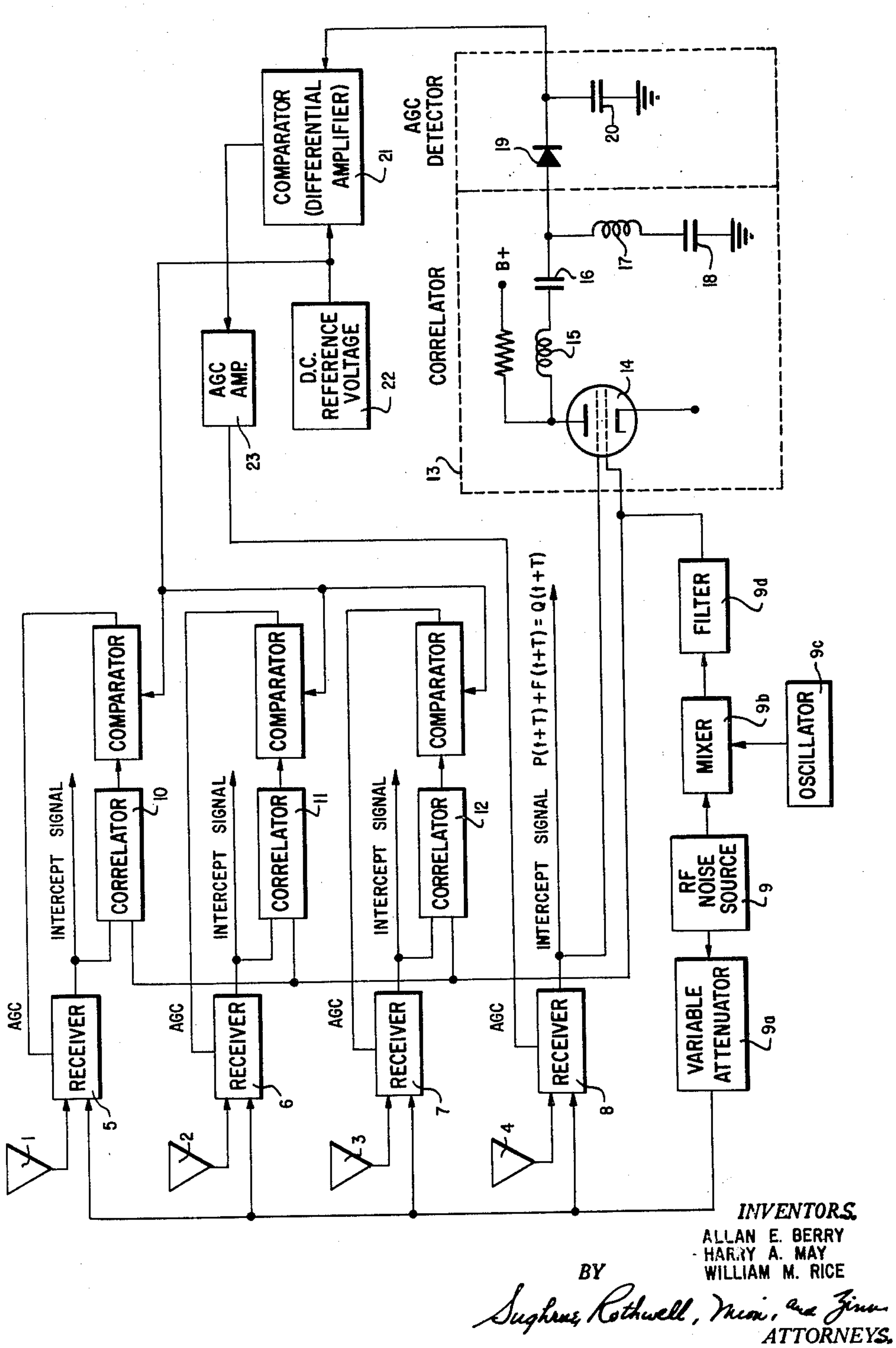
INVENTORS.
ALLAN E. BERRY
HARRY A. MAY
WILLIAM M. RICE
BY
Sughrue, Rothwell, Mion, and Zinn
ATTORNEYS.

United States Patent Office 3,196,355

Patented July 20, 1965

3,196,355
MULTIPLE CHANNEL GAIN CONTROL

Allan E. Berry and Harry A. May, Baltimore, and William M. Rice, Timonium, Md., assignors to Martin-Marietta Corporation, Baltimore, Md., a corporation of Maryland Filed Dec. 20, 1961, Ser. No. 160,765
5 Claims. (Cl. 325—407)

This invention relates to gain control circuits and more particularly to gain control circuits utilizing correlation techniques suitable for use with multiple channels.

Many radar and/or passive receiving systems require gain tracking techniques to develop bearing information. These systems utilize a multi-element antenna array together with a receiver channel for each antenna. By determining the amplitude differences in the radiation characteristics of the radar return in each channel, the bearing of the target may be ascertained.

One major difficulty in such systems, and other multiple channel systems, is that the gains of the amplifiers in the various channels may vary considerably, thereby adversely affecting the accuracy of the gain tracking system. One solution to this problem has been to manually calibrate all of the receiver channels. This requires considerable time and effort and even when it is accomplished, it is not entirely satisfactory since the gain of a receiver may vary during the time that it is in use.

In accordance with other prior art systems, automatic gain control is provided by inserting a calibrate signal into the front end of the receiver, removing this calibrate signal from the output of the receiver, noting the gain of the calibrate signal and adjusting the gain of the amplifier accordingly. This may be done, for example, by inserting an audio calibrate signal into the front end of the receiver and removing the calibrate signal from the output by a suitable filter. This has the very serious disadvantage that the developed automatic gain control signal is generated in accordance with the gain of the amplifier at audio frequency. Since the gain of the amplifier may vary considerably between the frequency of the calibrate signal and the frequency of the actual signal of interest, these systems have not been entirely successful. Also, if the calibrate signal is inserted close to or at the signal frequency it may cause signal distortion which may partially or totally destroy the usefulness of both the signal or calibrate outputs.

These and other problems of prior art gain tracking systems have been solved by utilizing correlation techniques to remove the calibrate signal from the output of the receiver.

Accordingly, it is an object of the present invention to provide automatic gain control for a plurality of channels by removing a calibrate signal from the output of the channel by correlation techniques and developing a gain control signal in accordance with the amplitude of the calibrate signal.

It is a further object of the present invention to provide a system which accomplishes dynamic absolute gain measurement under conditions of rapidly fluctuating or constant, unmodulated signals.

It is a further object of the present invention to provide a system in which the injected calibrate signal is sufficiently below the intercepted signal to prevent significant degradation of the receiver noise figure.

It is another object of the present invention to provide an improved gain tracking radar system in which the gains of the various channels are normalized by means of automatic gain control signals developed at the same frequency as the frequency of the signals received at the antennas.

It is a further object of the present invention to provide a multiple channel system in which a calibrate signal of random noise throughout the frequency band of the antenna input is inserted into each receiver, removed from the output of the receiver by correlation techniques and used to develop an automatic gain control for the receiver.

The foregoing and other objects, features and advantages of the invention will be apparent from the following more particular description of a preferred embodiment of the invention as illustrated in the accompanying drawing in which:

The figure shows the multiple channel system with automatic gain control of the present invention.

In accordance with one embodiment of the invention, a gain tracking system is provided in which a plurality of antennas are each serviced by a different receiver channel. A calibrate generator is provided to generate random noise having a frequency spectrum encompassing the frequency band width of the antenna inputs. The calibrate signal is inserted into the front end of each receiver where it is superimposed on the RF signal from the antenna. The amplitude of the calibrate signal at the receiver output is determined by the gain of the receiver. In order to separate the amplified calibrate signal from the remainder of the signals in the output of the receiver, correlation techniques are employed. In accordance with one embodiment, the correlator includes a multiplier and an integrator. The output of the receiver is multiplied by the calibrate signal from the calibrate generator. The output of the multiplier is then integrated. The resultant signal is indicative of the receiver gain. This resultant signal is used to develop an AGC signal which is applied to the receiver to normalize the gain of the receiver.

Referring to the figure, a plurality of antennas, 1–4 being shown, are provided to obtain bearing information regarding the target being tracked. Each antenna is associated with a receiver, 5–8, each of which develops an intercept signal in accordance with the radiation received by its associated antenna.

A calibrate generator 9, an RF noise source in the example shown, is provided to generate random noise having a frequency spectrum encompassing the band width of the antenna inputs. This calibrate signal is applied, through variable attenuator 9*a*, to receivers 5–8 at a level considerably lower than that of the intercept signal. Since the output of each receiver 5–8 comprises the sum of the RF signal from its associated antenna 1–4 and the calibrate signal, a correlation process is employed to separate the calibrate signal from the output signals of the receivers 5–8.

This correlation process includes correlating the output of the receiver with the calibrate signals from the RF noise source 9. In order to accomplish this correlation, the RF noise source is shifted in frequency so that the frequency band is slightly different from the RF band width in the outputs of the receivers. Frequency shifting is accomplished by the heterodyning circuitry including mixer 9*b*, oscillator 9*c* and filter 9*d*. The output of the RF noise source is mixed with a heterodyning frequency from the oscillator 9*c* and the output of the mixer is applied to filter 9*d*. This shifted frequency random noise, from the output of filter 9*d*, is applied to the correlators 10–13.

As shown in more detail at the correlator 13, each correlator includes a multiplier and an integrator. In this embodiment, the multiplier takes the form of an RF mixer tube 14 with the output of receiver 8 applied to one grid and the output of filter 9*d* applied to another grid thereof. The output of RF mixer 14, the product of the intercept signal and the calibrate signal, is applied to an integrator. The integrator is shown as including an inductance 15, a capacitor 16, an inductance 17, and a capacitor 18. It will be understood of course that the A.C. integrator can take various other forms than the filter circuitry shown.

The output of correlator 13 is applied to an AGC detector including the diode 19 and the capacitor 20. The AGC detector develops a D.C. voltage having an amplitude indicative of the gain of the receiver 8. This D.C. voltage is applied to differential amplifier 21 where it is compared with a D.C. reference voltage from the source 22. If the D.C. voltage from the AGC detector is the same as the D.C. reference voltage, indicating that the receiver 8 is operating at the desired gain, then the output of differential amplifier 21 is zero. However, if the D.C. voltage from the AGC detector varies above or below the D.C. reference voltage, the differential amplifier 21 produces an output which is used as an AGC signal to adjust the gain of the receiver 8 to the proper level so that the output of the AGC detector again becomes equal to the D.C. reference voltage from the source 22. The output of differential amplifier 21 is applied through an AGC amplifier 23 to the receiver 8.

The function of the correlator as applied to the problem of gain tracking may be better understood with reference to the following mathematical description. Each receiver channel passes the intercept signal $P(t)$ and the calibrate signal $f(t)$ with some time delay $\tau$ to one input of the correlator. The reference input of the correlator contains a duplicate of the calibrate signal $f(t)$. The correlator output is determined by the time coincidence between the input signal $P(t+\tau)+f(t+\tau)$ and the reference signal $f(t)$ through a multiplication and integration process. The autocorrelation function $\phi_{11}(\tau)$ represents the average coincident energy between the receiver calibrate signal $f(t+\tau)$ and the reference signal $f(t)$ That is:

$$(1)\qquad \phi_{11}(\tau)=\lim_{T\to\infty}\frac{1}{2T}\int_{-T}^{T} f(t)F(t+\tau)dt$$

The cross-correlation function $\phi_{12}(\tau)$ represents the average coincident energy between the intercept signal $P(t+\tau)$ and the reference signal $f(t)$. That is:

$$(2)\qquad \phi_{12}(\tau)=\lim_{T\to\infty}\frac{1}{2T}\int_{-T}^{T} f(t)P(t+\tau)dt$$

If $f(t)$ and $P(t)$ are unrelated, it can be shown that the autocorrelation function and the cross-correlation function approach infinity and zero, respectively, as the averaging period is increased without limit.

Since the averaging time of the correlator and the deviation of the signals $f(t)$ and $P(t)$ are not infinite, the noise term (cross-correlation function) $\phi_{12}(\tau)$ is not truly zero and the autocorrelation function is approximated by a finite time autocorrelation function (FTA). This finite time autocorrelation function for random noise signals is analyzed in detail in "The Output Signal-to-Noise Ratio of Correlation Detectors," by P. E. Green, Jr., Transactions of the IRE, March 1957.

For the present purposes, the following relationship describes the operation of the correlator:

$$(3)\qquad \left(\frac{S}{N}\right)_{out}=\left(\frac{S}{N}\right)_{in}BWI$$

where $$\left(\frac{S}{N}\right)_{out}$$

is the signal-to-noise ratio at the correlator output, $$\left(\frac{S}{N}\right)_{in}$$

is the signal-to-noise ratio at the correlator input and BWI is the correlator band width improvement ratio or ratio of input to output.

Correlators have been developed having a band width improvement of ratio of 40 db. Thus, the signal-to-noise ratio of the calibrate signal at the input to the correlator may be −20 db and the output of the correlator will still be a calibrate signal having a signal-to-noise ratio of +20 db. Since the correlator output signal is the average of the product of calibrate and reference signals, maintaining a constant reference signal level will permit the correlator output to describe exactly the gain and/or gain changes within its particular receiver channel.

While the invention has been described in conjunction with circuitry for developing an automatic gain control signal, it will be understood that the system could also be used for detecting absolute variations in the gain of a receiver. As an example, the D.C. voltage across the capacitor 20 is indicative of the absolute gain of the receiver 8 and could be used as a measurement of this gain.

While the invention has been shown and described in conjunction with a particular embodiment, it will, of course, be understood that various modifications may be made without departing from the principles of the invention. The appended claims are therefore intended to cover any such modifications within the true spirit and scope of the invention.

What we claim as new and desire to secure by Letters Patent of the United States is:

1. Automatic gain control circuitry for a multiple receiver system used to amplify separate input signals comprising a calibrate generator, said calibrate generator producing random noise throughout the frequency band of the input signals, means to insert the output of said calibrate generator into each of said receivers, correlation means for separating said calibrate signal from the output of each of said receivers, means for generating automatic gain control signals in accordance with the amplitude of the calibrate signals at the output of each of said receivers, and means for controlling the gains of each of said receivers in accordance with said automatic gain control signals.

2. The gain control circuitry recited in claim 1 wherein said correlation means includes a multiplier and an integrator associated with each of said receivers, the output of each receiver being connected to the associated multiplier, the output of said calibrate generator being connected to each of said multipliers, the output of each of said multipliers being connected to the associated integrator, the outputs of said integrators being used to develop said automatic gain control signals.

3. A gain tracking system producing a plurality of outputs in accordance with the radiation characteristics of inputs from a plurality of antennas comprising a plurality of receivers, each of said receivers being associated with one of said antennas, the input from each antenna being connected to the corresponding receiver, a calibrate generator, said calibrate generator producing random noise throughout the frequency band of said inputs, means to insert the output of said calibrate generator into each of said receivers, correlation means for separating said calibrate signal from the output of each of said receivers, means for generating automatic gain control signals in accordance with the amplitude of the calibrate signals at the output of each of said receivers, and means for controlling the gains of each of said receivers in accordance with said automatic gain control signals.

4. The gain tracking system recited in claim 3 wherein said correlation means includes a multiplier and an integrator associated with each of said receivers, the output of each receiver being connected to the associated multiplier, the output of said calibrate generator being connected to each of said multipliers, the outputs of each of said multipliers being connected to the associated integrator, the outputs of said integrators being used to develop said automatic gain control signals.

5. The automatic gain control circuitry recited in claim 4 wherein the means for generating the automatic gain control signals includes a comparator associated with each of said receivers, each of said comparators including an automatic gain control detector, the output of the associated integrator being connected to the input of said automatic gain control detector, a differential amplifier, a D.C. reference voltage source, the output of said automatic gain control detector being connected to said differential amplifier, said D.C. reference voltage being connected to said differential amplifier, said differential amplifier producing an output indicative of the difference between the output of said automatic gain control detector and said D.C. reference voltage, the output of said differential amplifier being used as said automatic gain control voltage.

References Cited by the Examiner

UNITED STATES PATENTS

| | | | |
|---|---|---|---|
| 2,799,734 | 7/57 | Camp | 330—132 |
| 2,841,784 | 7/58 | Starkes-Field et al. | 343—17.1 |
| 2,974,224 | 3/61 | Ule | 325—407 |

DAVID G. REDINBAUGH, *Primary Examiner.*

CHESTER L. JUSTUS, *Examiner.*